US009863493B2

(12) United States Patent
Kikudome et al.

(10) Patent No.: US 9,863,493 B2
(45) Date of Patent: Jan. 9, 2018

(54) NON-ASBESTOS FRICTION MATERIAL COMPOSITION, FRICTION MATERIAL USING SAME, AND FRICTION MEMBER

(75) Inventors: Takashi Kikudome, Ibaraki (JP); Mitsuo Unno, Ibaraki (JP); Kazuya Baba, Ibaraki (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 13/819,736

(22) PCT Filed: Nov. 7, 2011

(86) PCT No.: PCT/JP2011/075642
§ 371 (c)(1),
(2), (4) Date: May 10, 2013

(87) PCT Pub. No.: WO2012/066967
PCT Pub. Date: May 24, 2012

(65) Prior Publication Data
US 2013/0220747 A1    Aug. 29, 2013

(30) Foreign Application Priority Data

Nov. 19, 2010  (JP) .................. 2010-259504

(51) Int. Cl.
*F16D 65/092*    (2006.01)
*F16D 69/02*     (2006.01)

(52) U.S. Cl.
CPC ......... *F16D 65/092* (2013.01); *F16D 69/026* (2013.01); *F16D 2200/0065* (2013.01); *F16D 2200/0069* (2013.01); *F16D 2200/0073* (2013.01); *F16D 2200/0086* (2013.01)

(58) Field of Classification Search
CPC ...................... F16D 69/026; F16D 2200/0065
USPC ........................................................ 523/139
See application file for complete search history.

(56) References Cited

U.S. PATENT DOCUMENTS 3,645,706 A * 2/1972 Bovenkerk et al. ........... 51/295
6,413,622 B1 * 7/2002 Kobayashi ................. 428/293.1
7,306,665 B2 * 12/2007 Nagayoshi ............ F16D 69/026
                                                          106/36
2005/0242477 A1 * 11/2005 Haun ........................... 264/601
2006/0241207 A1 * 10/2006 Lam et al. .................... 523/149

FOREIGN PATENT DOCUMENTS

| JP | 2002-138273 | 5/2002 |
| JP | 2003-13044 | 1/2003 |
| JP | 2010-24429 | 2/2010 |
| JP | 2011-241381 | 12/2011 |
| WO | WO 2010/140265 A1 | 12/2010 |

OTHER PUBLICATIONS

Bart-Plange, A, Some Physical and Mechanical Properties of Cashew Nut, International Journal of Science and Nature, vol. 3(2) 2012: 406-415.*
Lapinus, Mineral Fiber, MSDS, 2013.*
Chan and Stachowiak, Review of automotive brake friction materials, Proceedings of the Institution of Mechanical Engineers vol. 218, 2004.
Memorandum of Understanding on Copper Mitigation in Watersheds and Waterways between the U.S. Environmental Protection Agency and Motor and Equipment Manufacturers Association, Automotive Aftermarket Suppliers Association, Brake Manufacturers Council and Heavy Duty Manufactures Association and Autocare Association and Alliance of Automobile Manufacturers and Association of Global Automakers, Inc. and Truck and Engine Manufacturers Association and Environmentaql Council of the States.

* cited by examiner

*Primary Examiner* — Doris L Lee
(74) *Attorney, Agent, or Firm* — Fitch, Even, Tabin & Flannery, LLP

(57) ABSTRACT

A non-asbestos frictional material composition is provided, which is capable of provide a frictional material with low environmental load and with excellent friction coefficient, anti-crack properties, and abrasion resistance compared with conventional ones. Furthermore, a frictional material and a friction member formed by using this non-asbestos frictional material composition are provided. The non-asbestos frictional material composition containing a binder, an organic filler, an inorganic filler, and a fiber base material, includes: copper in a content of 5 mass % or less as a copper element; a metal fiber other than a copper fiber and a copper alloy fiber in a content of 0.5 mass % or less; cashew dust in a content of 1.5-4.5 mass % as the organic filler; zirconium oxide with a particle size of 30 μm or less in a content of 30-45 mass % but not containing zirconium oxide with a particle size of more than 30 μm as the inorganic filler.

8 Claims, No Drawings

NON-ASBESTOS FRICTION MATERIAL COMPOSITION, FRICTION MATERIAL USING SAME, AND FRICTION MEMBER

TECHNICAL FIELD

The present invention relates to a non-asbestos frictional material composition, and a frictional material and a friction member formed by using the composition. Specifically, the present invention relates to a non-asbestos frictional material composition with low environmental load due to the low content of copper and with excellent friction coefficient, anti-crack properties, and abrasion resistance, which is appropriate for frictional materials such as a disc brake pad and a brake lining to brake a car and the like, particularly a friction material such as a disc brake pad with high load during the braking. The present invention further relates to a frictional material and a friction member formed by using this non-asbestos frictional material composition.

BACKGROUND ART

Frictional materials such as a disc brake pad and a brake lining are used for braking a car and the like. The frictional materials play a role in the brake by frictioning facing members such as a disc rotor and a brake drum. Therefore, for the frictional materials, not only increasing and stabilizing the friction coefficient but also hardly wearing the disc rotor that is a facing member (anti-rotor-abrasion resistance), hardly generating the squeal (squeal properties), and prolonging the life of the pad (abrasion resistance) are required. The durability performance such as no shearing during the braking at a high load (shear strength) or no cracks by the high temperature braking history (anti-crack properties) are also required.

A frictional material includes a binder, a fiber base material, an inorganic filler, and an organic filler, generally in combination with one or two or more kinds thereof to provide the above-mentioned properties. As the fiber base material, an organic fiber, a metal fiber, an inorganic fiber, and the like are used. To improve the anti-crack properties and the abrasion resistance, a copper fiber and a copper alloy fiber are generally used as the metal fiber. To further improve the abrasion resistance, chips and powders of copper and copper alloy may be used. As the frictional material, a non-asbestos frictional material is a mainly used, which is formed by using a large amount of copper, copper alloy, and the like.

However, the frictional material containing copper and copper alloy generates abrasion powder containing copper during the braking. Since it is suggested that the abrasion powder leads to pollution of rivers, lakes, and oceans, there is a movement accelerated to control the use of the non-asbestos frictional material. To provide a frictional material containing no copper or copper alloy with excellent friction coefficient, abrasion resistance, and rotor abrasion resistance, it is proposed that the frictional material for the brake with a fiber base material, a binder, and a friction adjustment component do not contain a heavy metal or a heavy-metal compound and that the frictional material contains magnesium oxide and graphite in a content of 45-80 vol %, in which the ratio of magnesium oxide to graphite is 1/1-4/1 (see to Patent document 1).

Citation List
Patent document 1: JP 2002-138273A

DISCLOSURE OF THE INVENTION

However, the frictional material for the brake of Patent document 1 hardly satisfies all of the friction coefficient, the anti-crack properties, and the abrasion resistance.

On the other hand, as metal fibers other than a copper fiber contained in the frictional material, iron fibers such as a steel fiber and a cast iron fiber are used for the purpose of improving the anti-crack properties. However, iron fibers have a disadvantage of the high aggression to a facing member. Nonferrous metal fibers such as a zinc fiber and an aluminum fiber generally used for a frictional material as metal fibers other than a copper fiber often have a low heatproof temperature compared with a copper fiber and an iron fiber. This causes a problem of the deteriorated abrasion resistance of the frictional material.

An inorganic fiber is used to improve the anti-crack properties of the frictional material. However, to obtain the satisfied anti-crack properties, a large amount of inorganic fiber should be added. This causes a problem of the deteriorated abrasion resistance.

It is known that the use of graphite can improve the abrasion resistance of the frictional material. However, to obtain the satisfied anti-crack properties, a large amount of graphite should be added. This causes a problem of the substantially lowered friction coefficient.

As mentioned above, the frictional material containing the reduced content of copper has poor abrasion resistance and anti-crack properties and hardly satisfies all of the friction coefficient, the anti-crack properties, and the abrasion resistance.

In view of such a background, the objective of the present invention is to provide a non-asbestos frictional material composition capable of providing a frictional material with excellent friction coefficient, anti-crack properties, and abrasion resistance, and also providing a frictional material and a friction member formed by using this non-asbestos frictional material composition, even with the reduced content of copper possibly causing pollution of rivers, lakes, oceans and the like.

As a result of their great effort, the present inventors have found that the above-mentioned problem can be solved by a non-asbestos frictional material composition containing a copper and a metal fiber other than a copper fiber and a copper alloy fiber at a certain level or less and essentially containing a specific amount of cashew dust and zirconium oxide with a particle size falling within a specific range so as to achieve the present invention.

The present invention is as follows.

(1) A non-asbestos frictional material composition containing a binder, an organic filler, an inorganic filler, and a fiber base material includes: copper in a content of 5 mass % or less as a copper element; a metal fiber other than a copper fiber and a copper alloy fiber in a content of 0.5 mass % or less; cashew dust in a content of 1.5-4.5 mass % as the organic filler; zirconium oxide with a particle size of 30 μm or less in a content of 30-45 mass % but not containing zirconium oxide with a particle size of more than 30 μm as the inorganic filler.

(2) The non-asbestos frictional material composition according to (1), wherein the mean particle size of the zirconium oxide falls within the range of 1-7 μm.

(3) A frictional material being formed from the non-asbestos frictional material composition according to (1) or (2).

(4) A friction member being formed from the frictional material formed from the non-asbestos frictional material composition according to (1) or (2) and a backing plate.

Advantageous Effects of the Invention

When used for frictional materials such as a disc brake pad and a brake lining for a car, the non-asbestos frictional material composition of the present invention has low environmental load due to the low content of copper in abrasion powder generated during the braking and can provide excellent friction coefficient, anti-crack properties, and abrasion resistance. The use of the non-asbestos frictional material composition of the present invention can provide a frictional material and a friction member with the above-mentioned properties.

Preferred Mode for Carrying Out the Invention

The non-asbestos frictional material composition of the present invention, and a frictional material and a friction member formed by using the composition will be described in detail below. In the present invention, the non-asbestos frictional material composition, the non-asbestos frictional material, and the non-asbestos friction member are referred to as a frictional material composition, a frictional material, and a friction member which do not substantially contain asbestos, respectively. The non-asbestos frictional material composition is sometimes simply referred to as "frictional material composition," the non-asbestos frictional material as "frictional material," and the non-asbestos friction member as "friction member."

Non-Asbestos Frictional Material Composition

The non-asbestos frictional material composition of the present invention containing a binder, an organic filler, an inorganic filler, and a fiber base material includes: copper in a content of 5 mass % or less as a copper element; a metal fiber other than a copper fiber and a copper alloy fiber in a content of 0.5 mass % or less; cashew dust in a content of 1.5-4.5 mass % as the organic filler; zirconium oxide with a particle size of 30 μm or less in a content of 30-45 mass % but not containing zirconium oxide with a particle size of more than 30 μm as the inorganic filler.

According to this structure, a frictional material and a friction member formed by using the non-asbestos frictional material composition of the present invention has low environmental load due to the low content of copper in abrasion powder generated during the braking and provides excellent friction coefficient, anti-crack properties, and abrasion resistance, compared with conventional ones.

(Binder)

The binder binds an organic filler, an inorganic filler, a fiber base material, and the like in the frictional material composition to provide strength. As the binder contained the non-asbestos frictional material composition of the present invention, any binders can be used without any limitation in particular as long as being thermosetting resins typically used as a binder of the frictional material.

The above-mentioned thermosetting resins include, for example, a phenol resin; various elastomer-dispersed phenol resins such as an acrylic elastomer-dispersed phenol resin, and a silicone elastomer-dispersed phenol resin; and various modified phenol resins such as an acrylic-modified phenol resin, a silicone-modified phenol resin, a cashew-modified phenol resin, an epoxy-modified phenol resin, and an alkylbenzene-modified phenol resin. These can be used alone or in combination with two or more kinds thereof. In particular, a phenol resin, an acrylic-modified phenol resin, a silicone-modified phenol resin, and an alkylbenzene-modified phenol resin are preferable for providing excellent heat resistance, moldability, and friction coefficient.

The content of the binder in the non-asbestos frictional material composition of the present invention is preferably 5-20 mass %, more preferably 5-10 mass %. The content of the binder adjusted to 5-20 mass % can further prevent the reduced strength of the frictional material and the deterioration of the sound vibration performance such as squeal due to the reduced porosity of the frictional material and the increased elastic modulus.

(Organic Filler)

The organic filler is contained as a friction modifier to improve the sound vibration performance, the abrasion resistance, and the like of the frictional material.

The non-asbestos frictional material composition of the present invention essentially contains cashew dust with a content of 1.5-4.5 mass % as the organic filler.

The cashew dust is obtained by grinding cured cashew nut oil and commercially available. The cashew dust coated with the below-mentioned rubber component may be used.

The particle size of the cashew dust is preferably 850 μm or less, more preferably 750 μm or less, further more preferably 600 μm or less, yet further more preferably 500 μm or less, from the viewpoint of the dispersibility.

The content of the cashew dust adjusted to 1.5 mass % or more can provide excellent friction coefficient, anti-crack properties, and abrasion resistance. The content adjusted to 4.5 mass % or less can prevent the lowered friction coefficient and the deteriorated anti-crack properties. The content of the cashew dust in the non-asbestos frictional material composition of the present invention is preferably 1.8-4.2 mass %, more preferably 2.0-4.0 mass %.

For the non-asbestos frictional material composition of the present invention, an organic filler other than the above-mentioned cashew dust can be used together.

As such an organic filler, any organic fillers can be used without limitation in particular as long as being organic fillers typically used for the frictional material. The organic filler includes a rubber filler such as natural rubber, acrylic rubber, isoprene rubber, polybutadiene rubber (BR), nitrile-butadiene rubber (NBR), and styrene-butadiene rubber (SBR). These can be used alone or in combination with two or more kinds thereof. As the organic filler, the cashew dust and the above-mentioned rubber filler is preferably used together from the viewpoint of the sound vibration performance.

When the cashew dust and an organic filler other than the above-mentioned cashew dust are used together, the mass ratio of the cashew dust to the organic filler other than the above-mentioned cashew dust preferably falls within the range of 2/1-10/1, more preferably 2/1-9/1, further more preferably 2/1-6/1.

The content of the above-mentioned organic filler, including cashew dust, in the non-asbestos frictional material composition of the present invention is preferably 1-20 mass %, more preferably 1-10 mass %, further more preferably 1-5.5 mass %. The content of the organic filler adjusted to 1-20 mass % can prevent the increased elastic modulus of the frictional material, the deteriorated sound vibration performance such as squeal, the deteriorated heat resistance, and the reduced strength due to the heat history.

(Inorganic Filler)

The inorganic filler is contained as a friction modifier to prevent the heat resistance of the frictional material from deteriorating.

The non-asbestos frictional material composition of the present invention essentially contains zirconium oxide with a particle size of 30 μm or less in a content of 30-45 mass % but not substantially containing zirconium oxide with a particle size of more than 30 μm as the inorganic filler.

The content of the zirconium oxide adjusted to 30 mass % or more can provide excellent friction coefficient, anti-crack properties, and abrasion resistance. The content adjusted to 45 mass % or less can prevent the abrasion resistance deteriorating. The content of the above-mentioned zirconium oxide is preferably 31-44 mass %.

The mean particle size of the zirconium oxide adjusted to 30 μm or less can provide excellent friction coefficient and prevent the abrasion resistance from deteriorating. The particle size of the zirconium oxide is preferably 28 μm or less, more preferably 26 μm or less.

The non-asbestos frictional material composition of the present invention does not contain zirconium oxide with a particle size of more than 30 μm from the viewpoint of the friction coefficient and the abrasion resistance. The phrase "not containing zirconium oxide with a particle size of more than 30 μm" used herein means that zirconium oxide with a particle size of more than 30 μm is contained in a content of 1.0 mass % or less, preferably 0.5 mass % or less based on the total content of zirconium oxide contained in the non-asbestos frictional material composition of the present invention. More preferably, the content of the zirconium oxide with a particle size of more than 30 μm is 0 mass %.

The mean particle size of the above-mentioned zirconium oxide is preferably 1-7 μm, more preferably 1-6.5 μm. The mean particle size of the zirconium oxide adjusted to 1 μm or more can provide excellent friction coefficient and abrasion resistance. The mean particle size adjusted to 7 μm or less can prevent the abrasion resistance from deteriorating. The particle size and the mean particle size of the zirconium oxide can be measured using a method such as particle size distribution measurement by laser diffraction. For example, these can be measured with a laser diffraction/scattering particle size distribution measurement device LA•920 (available from HORIBA, Ltd.).

For the non-asbestos frictional material composition of the present invention, an inorganic filler other than the above-mentioned zirconium oxide can be used together. As the inorganic filler, any inorganic fillers can be used without limitation in particular as long as being inorganic fillers typically used for the frictional material.

The inorganic filler includes, for example, antimony trisulfide, tin sulfide, molybdenum disulfide, iron sulfide, bismuth sulfide, zinc sulfide, calcium hydroxide, calcium oxide, sodium carbonate, calcium carbonate, magnesium carbonate, barium sulfate, dolomite, coke, iron oxide, vermiculite, granular potassium titanate, calcium sulfate, plate-like potassium titanate, graphite, mica, talc, clay, zeolite, zirconium silicate, mullite, chromite, titanium oxide, magnesium oxide, silica, and an activated alumina such γ alumina. These can be used alone in combination with two or more kinds thereof. From the viewpoint of decreasing the aggressiveness to a facing member, graphite and barium sulfate are preferably contained.

The content of the above-mentioned inorganic filler, including zirconium oxide, in the non-asbestos frictional material composition of the present invention is preferably 30-85 mass %, more preferably 55-85 mass %, furthermore preferably 70-85 mass %. The content of the inorganic filler adjusted to 30-85 mass % can prevent the heat resistance from deteriorating.

(Fiber Base Material)

The fiber base material exhibits a reinforcement effect on the improvement the mechanical strength and the like of the frictional material.

The fiber base material used in the present invention includes an inorganic fiber, a metal fiber, an organic fiber, and a carbon fiber. These can be used alone or in combination with two or more kinds thereof.

The above-mentioned inorganic fiber includes a ceramic fiber, a biodegradable ceramic fiber, a mineral fiber, a glass fiber, a potassium titanate fiber, a silicate fiber, and wollastonite. These can be used alone or in combination with two or more kinds thereof.

Among these inorganic fibers, a potassium titanate fiber and a ceramic fiber, which are easily inhaled into a human body, are preferably not contained, but a biodegradable ceramic fiber and a biodegradable mineral fiber contained in any combination with $SiO_2$, $Al_2O_3$, CaO, MgO, FeO, $Na_2O$, and the like are preferable, from the viewpoint of decreasing the environmental load material.

The mineral fiber is referred herein to as an artificial inorganic fiber in which blast furnace slag for slag wool, basalt for basalt fiber, and other natural stone are melt-spun as the main component. The mineral fiber is preferably a natural mineral containing an Al element. Specifically, the mineral fiber containing $SiO_2$, $Al_2O_3$, CaO, MgO, FeO, $Na_2O$, and the like alone or in combination with two or more kinds thereof can be used.

Preferably, the mineral fiber containing an Al element can be used. As the mean fiber length of the total mineral fiber contained in the frictional material composition increases, the bond strength with each of the components of the frictional material composition tends to be decreased. Therefore, the mean fiber length of the entire mineral fiber is preferably 500 μm or less, more preferably 100-400 μm. The mean fiber length is referred herein to as the number average fiber length indicating the average length of the total corresponding fibers. For example, the mean fiber length of 200 μm indicates that the average length of 50 mineral fibers which are randomly selected and then measured with a light microscope is 200 μm.

The mineral fiber used in the present invention is preferably biosoluble from the viewpoint of the harmful effect on a human body. The biosoluble mineral fiber is referred herein to as a mineral fiber with the feature to be partially broken down in a short time and eliminated from the body even when entering a human body. Specifically, the biosoluble mineral fiber denotes a fiber satisfying the condition in which the chemical composition shows that the total content of an alkali oxide and an alkaline earth oxide (oxides of sodium, potassium, calcium, magnesium, and barium) is 18 mass % or more, in which the short-term continuous aspiration test shows the half-life of 20 μm or more of fiber is 40 days or less, in which the intraperitoneal test shows no evidence for excessive carcinogenic properties, or in which the long-term continuous aspiration test shows no associated pathogenesis or tumorigenesis (Nota Q of EU directive 97/69/EC (exempted from the carcinogenic classification)). Such a biodegradable mineral fiber includes $SiO_2$—$Al_2O_3$—CaO—MgO—FeO—$Na_2O$-type fiber, and a fiber containing $SiO_2$, $Al_2O_3$, CaO, MgO, FeO, and $Na_2O$ in any combination thereof. The commercially available product includes the Roxul fibers produced by LAPINUS FIBRES B.V. The Roxul contains $SiO_2$, $Al_2O_3$, CaO, MgO, FeO, and $Na_2O$.

As the above-mentioned metal fiber, a copper fiber or a copper alloy fiber can be used to improve the anti-crack properties and the abrasion resistance. The copper fiber or the copper alloy fiber includes a copper fiber, a brass fiber, and a bronze fiber. These can be used alone or in combination with two or more kinds thereof.

However, when the copper fiber or the copper alloy fiber is contained, the total content of copper in the non-asbestos frictional material composition of the present invention should fall within the range of 5 mass % or less, preferably 0.5 mass % or less, as a copper element from the viewpoint of the environmental load.

As the above-mentioned metal fiber, a metal fiber other than a copper fiber and a copper alloy fiber may be used from the viewpoint of improving the friction coefficient and the anti-crack properties. The metal fiber other than a copper fiber and a copper alloy fiber includes, for example, fibers of metals such as aluminum, iron, zinc, tin, titanium, nickel, magnesium, silicon alone, or the alloy thereof, and a fiber mainly containing metal, such as a cast iron fiber. These can be used alone or in combination with two or more kinds thereof.

From the viewpoint of the abrasion resistance, the content of a metal other than copper and copper alloy in the non-asbestos frictional material composition of the present invention should fall within the range of 0.5 mass % or less. From the viewpoint of improving the abrasion resistance, no metal fibers other than a copper fiber and a copper alloy fiber are preferably contained (0 mass %).

In the present invention, the organic fiber is referred to as a fibrous material mainly containing an organic substance but not as the below-mentioned carbon fibers and used to improve the anti-crack properties and the abrasion resistance, and the like.

The above-mentioned organic fiber includes an aramid fiber, a cellulose fiber, an acrylic fiber, and a phenol resin fiber (with a cross-linked structure). These can be used alone or in combination with two or more kinds thereof. As the organic fiber, an aramid fiber is preferably used from the viewpoint of the abrasion resistance.

The above-mentioned carbon fiber includes a flame-resistant fiber, a pitch-based carbon fiber, a polyacrylonitrile (PAN) carbon fiber, and an active carbon fiber. These can be used alone or in combination with two or more kinds thereof.

The content of the fiber base material, including a copper fiber or a copper alloy fiber in the non-asbestos frictional material composition of the present invention is preferably 5-40 mass %, more preferably 5-20 mass %, further more preferably 5-10 mass %. The content of the fiber base material adjusted to 5-40 mass % provides an appropriate porosity as the frictional material so as to prevent the deteriorated sound vibration performance such as squeal due to the high elastic modulus. Appropriate material strength and appropriate abrasion resistance are also provided so that the moldability can also be improved.

(Other Materials)

In the non-asbestos frictional material composition of the present invention, materials other than the binder, the organic filler, the inorganic filler, and a fiber base material can optionally be blended.

For example, unless the total content of copper in the non-asbestos frictional material composition of the present invention exceeds 5 mass % as a copper element, metal powder such as copper powder, brass powder, and bronze powder can be blended. For example, to improve the abrasion resistance, an organic additive including a fluorine polymer such as polytetrafluoroethylene (PTFE) can be blended.

[Frictional Material and Friction Member]

The present invention also provides a frictional material and a friction member formed by using the above-mentioned non-asbestos frictional material composition.

The non-asbestos frictional material composition of the present invention can be molded for the use as frictional materials such as a disc brake pad and a brake lining for a car. The frictional material of the present invention exhibits excellent friction coefficient, anti-crack properties, and abrasion resistance and is therefore suitable for a disc brake pad with a large load during the braking.

Through the use of the above-mentioned frictional material, a friction member, which is formed so that the frictional material is the frictional surface, can be obtained. The friction member of the present invention that can be formed by using the frictional material includes, for example, the following structures.

Structure (1): Only the frictional material is contained.
Structure (2): A backing plate and the frictional material consisting of the non-asbestos frictional material composition of the present invention are contained, in which the frictional material is formed to be the frictional surface on the backing plate. Structure (3): In the structure (2), a primer layer to modify the surface for improving the adhesive effect of the backing plate and an adhesive layer to bond the backing plate with the frictional material are placed between the backing plate and the frictional material.

The above-mentioned backing plate is typically used for a friction member to improve the mechanical strength of the friction member. As the material of the backing plate, a metal, a fiber-reinforced plastic, or the like can be used. The material, for example, includes iron, stainless steel, inorganic fiber-reinforced plastic, and a carbon fiber-reinforced plastic. As the primer layer and the adhesive layer, any materials may be used as long as used for a friction member such as a brake shoe.

The frictional material of the present invention can be fabricated using a generally used method by molding, preferably hot press-molding the non-asbestos frictional material composition of the present invention.

Specifically, the non-asbestos frictional material composition of the present invention is uniformly mixed by using a mixer such as a Loedige mixer, a pressure kneader, and an Eirich intensive mixer. The mixture is preformed in a mold. The obtained preformed material is molded under the condition at a molding temperature of 130-160° C. and a molding pressure of 20-50 MPa for 2-10 minutes. The obtained molded product is heated at 150-250° C. for 2-10 hours. The frictional material can be fabricated by coating, scorching, and polishing as needed.

The frictional material formed from the non-asbestos frictional material composition is useful as the "over layer" of friction members such as a disc brake pad and a brake lining due to excellent friction coefficient, anti-crack properties, and abrasion resistance. The frictional material can be used for being formed as the "under layer" of friction members due to the high anti-crack properties as the frictional material.

The "over layer" is the frictional material formed so as to be the frictional surface of the friction member. The "under layer" is a layer placed between the frictional material formed to be the frictional surface of the friction member and the backing plate in order to improve the shear strength and the anti-crack properties around the part bonding the frictional material with the backing plate.

EXAMPLES

The non-asbestos frictional material composition, the frictional material, and the friction member of the present invention will be described in detail in reference to Examples and Comparative examples. However, the present invention is not limited to these examples.

Examples 1-6 and Comparative Examples 1-10

(Production of Disc Brake Pad)

The materials were blended according to the blend ratio shown in Tables 1 and 2 to obtain the frictional material compositions of Examples 1-6 and Comparative examples 1-10. Each of the frictional material compositions was mixed using a Loedige mixer (available from MATSUBO Corporation, brand name: Loedige mixer M20). This mixture was preformed with a molding press (available from OJIKIKAI CO., LTD). The obtained preformed material was hot press-molded together with an iron backing plate (available from Hitachi Automotive Systems, Ltd.) using a molding press (SANKI SEIKO CO., LTD.) under the condition at a molding temperature of 145° C. and a molding pressure of 30 MPa for 5 minutes. The obtained molded article was heated at 200° C. for 4.5 hours, polished with a rotary polisher, and then scorched at 500° C. to obtain the disc brake pads of Examples 1-6 and Comparative examples 1-10. In these examples and comparative examples, disc brake pads with having a backing plate thickness of 6 mm, a frictional material thickness of 11 mm, and a frictional material projected area of 52 cm$^2$ were produced.

(Evaluation of Friction Coefficient)

The friction coefficient was measured based on Japanese Automotive Standards Organization JASO C406. The average of friction coefficients measured in the second effectiveness test was calculated.

(Evaluation of Anti-Crack Properties)

The braking was repeated at a brake temperature of 400° C. (initial speed: 50 km/h, closing speed: 0 km/h, deceleration: 0.3 G, brake temperature before braking: 100° C.) based on JASO C427 until the thickness of the each frictional material was reduced to half. The generation of cracks on the side face and the frictional surface of the each frictional material was measured. The generation of cracks was evaluated with the following scores 1-3.

Score 1: No cracks were generated.

Score 2: Cracks were generated to the extent where a 0.1 mm thickness gauge does not enter the frictional surface or the side face of the frictional material.

Score 3: Cracks were generated to the extent where a 0.1 mm thickness gauge enters the frictional surface or the side face of the frictional material.

When cracks were generated to the extent where a 0.1 mm thickness gauge does not enter one of the frictional surface and the side face of the frictional material but enters the other, the generation of cracks was evaluated as Score 3.

(Evaluation of Abrasion Resistance)

The abrasion resistance was measured based on Japanese Automotive Standards Organization JASO C427. The abrasion loss of the each frictional material, which corresponds to 1000 times of braking at brake temperatures of 100° C. and 300° C., were evaluated.

The friction coefficient, the abrasion resistance, and the anti-crack properties were evaluated at an inertia of 7 kgf·m·s$^2$ with a dynamometer (available from SANKI SEIKO CO., LTD.) based on the above-mentioned JASO C406 and JASO C427. The above-mentioned evaluation was carried out using a ventilated disc rotor (material: FC190, available from KIRIU Corporation) and a general pin sliding collet type caliper.

The evaluation results are shown in Tables 1 and 2.

Details of the each structural component shown in Tables 1 and 2 are as follows. The mean particle size and the maximum particle size as described below were measured with a laser diffraction/scattering particle size distribution measurement device LA•920 (available from HORIBA, Ltd.).

(Binder)

Phenol resin: available from Hitachi Chemical Co., Ltd. (brand name: HP491UP)

(Organic Filler)

Cashew dust: available from Tohoku Chemical Industries, Ltd (brand name: FF-1056, maximum particle size: 500 μm)

(Inorganic Filler)

Barium sulfate: available from SAKAI CHEMICAL INDUSTRY CO., LTD. (brand name: Barium sulfate BA)

Graphite: available from TIMCAL (brand name: KS75)

Mica: available from Imerys (Brand name: 325HK, mean particle diameter 25 μm, maximum particle size 100 μm)

Potassium titanate: available from Kubota Corporation (Brand name: TXAX-MA, plate-like potassium titanate)

Tin sulfide: available from Chemetall (brand name: Stannolube)

Calcium hydroxide: available from Chichibu Lime Industry CO., LTD (brand name: SA-149)

Zirconium oxide A: available from DAIICHI KIGENSO KAGAKU KOGYO CO., LTD. (brand name: BR-3QZ, mean particle diameter: 2.0 μm, maximum particle size: 15 μm)

Zirconium oxide B: available from DAIICHI KIGENSO KAGAKU KOGYO CO., LTD. (brand name: BR-QZ, mean particle diameter: 6.5 μm, maximum particle size: 26 μm)

Zirconium oxide C: available from DAIICHI KIGENSO KAGAKU KOGYO CO., LTD. (brand name: BR-12QZ, mean particle diameter: 8.5 μm, maximum particle size: 45 μm)

(Organic Fiber)

Aramid fiber: available from DU PONT-TORAY CO., LTD. (brand name: 1F538)

(Metal Fiber)

Copper fiber: available from Sunny Metal (brand name: SCA-1070)

Iron fiber: available from GMT (brand name: #0)

(Inorganic Fiber)

Mineral fiber: available from LAPINUS FIBRES B.V. (brand name: RB240Roxul 1000, mean fiber length: 300 μm)

TABLE 1

| | | | Examples | | | | | |
|---|---|---|---|---|---|---|---|---|
| | | | 1 | 2 | 3 | 4 | 5 | 6 |
| Frictional material composition (mass %) | Binder | Phenol resin | 8 | 8 | 8 | 8 | 8 | 8 |
| | Organic filler | Cashew dust | 2 | 3 | 4 | 3 | 3 | 3 |
| | | SBR powder | 1 | 1 | 1 | 1 | 1 | 1 |
| | Inorganic filler | Barium sulfate | 28 | 22 | 21 | 17 | 26 | 22 |
| | | Graphite | 5 | 5 | 5 | 5 | 5 | 5 |
| | | Mica | 5 | 5 | 5 | 5 | 5 | 5 |
| | | Potassium titanate | 4 | 4 | 4 | 4 | 4 | 4 |
| | | Tin sulfide | 4 | 4 | 4 | 4 | 4 | 4 |
| | | Calcium hydroxide | 2 | 2 | 2 | 2 | 2 | 2 |
| | | Zirconium oxide A | 32 | 37 | 37 | 42 | 37 | 0 |
| | | Zirconium oxide B | 0 | 0 | 0 | 0 | 0 | 37 |
| | | Zirconium oxide C | 0 | 0 | 0 | 0 | 0 | 0 |
| | Fiber base material | Aramid fiber | 2 | 2 | 2 | 2 | 2 | 2 |
| | | Copper fiber | 4 | 4 | 4 | 4 | 0 | 4 |
| | | Iron fiber | 0 | 0 | 0 | 0 | 0 | 0 |
| | | Mineral fiber | 3 | 3 | 3 | 3 | 3 | 3 |
| Content of copper as copper element (mass %) | | | 4 | 4 | 4 | 4 | 0 | 4 |
| Content of metal fiber other than copper fiber and copper alloy fiber (iron fiber) (mass %) | | | 0 | 0 | 0 | 0 | 0 | 0 |
| Content of cashew dust (mass %) | | | 2 | 3 | 4 | 3 | 3 | 3 |
| Content of zirconium oxide (mass %) | | | 32 | 37 | 37 | 42 | 37 | 37 |
| Evaluation | Friction coefficient | | 0.40 | 0.40 | 0.40 | 0.41 | 0.40 | 0.40 |
| | Anti-crack properties | | Score 1 | Score 1 | Score 1 | Score 1 | Score 1 | Score 1 |
| | Abrasion resistance (mm/1000 brakings) | 100° C. | 0.101 | 0.095 | 0.098 | 0.111 | 0.114 | 0.108 |
| | | 300° C. | 0.55 | 0.53 | 0.56 | 0.62 | 0.67 | 0.62 |

TABLE 2

| | | | Comparative examples | | | | | | | | | |
|---|---|---|---|---|---|---|---|---|---|---|---|---|
| | | | 1 | 2 | 3 | 4 | 5 | 6 | 7 | 8 | 9 | 10 |
| Frictional material composition (mass %) | Binder | Phenol resin | 8 | 8 | 8 | 8 | 8 | 8 | 8 | 8 | 8 | 8 |
| | Organic filler | Cashew dust | 3 | 1 | 1 | 1 | 5 | 3 | 3 | 3 | 3 | 3 |
| | | SBR powder | 1 | 1 | 1 | 1 | 1 | 1 | 1 | 1 | 1 | 1 |
| | Inorganic filler | Barium sulfate | 16 | 36 | 40 | 24 | 20 | 34 | 9 | 22 | 22 | 21 |
| | | Graphite | 5 | 5 | 5 | 5 | 5 | 5 | 5 | 5 | 5 | 5 |
| | | Mica | 5 | 5 | 5 | 5 | 5 | 5 | 5 | 5 | 5 | 5 |
| | | Potassium titanate | 4 | 4 | 4 | 4 | 4 | 4 | 4 | 4 | 4 | 4 |
| | | Tin sulfide | 4 | 4 | 4 | 4 | 4 | 4 | 4 | 4 | 4 | 4 |
| | | Calcium hydroxide | 2 | 2 | 2 | 2 | 2 | 2 | 2 | 2 | 2 | 2 |
| | | Zirconium oxide A | 37 | 25 | 25 | 37 | 37 | 25 | 50 | 0 | 18 | 37 |
| | | Zirconium oxide B | 0 | 0 | 0 | 0 | 0 | 0 | 0 | 0 | 0 | 0 |
| | | Zirconium oxide C | 0 | 0 | 0 | 0 | 0 | 0 | 0 | 37 | 19 | 0 |
| | Fiber base material | Aramid fiber | 2 | 2 | 2 | 2 | 2 | 2 | 2 | 2 | 2 | 2 |
| | | Copper fiber | 10 | 4 | 0 | 4 | 4 | 4 | 4 | 4 | 4 | 4 |
| | | Iron fiber | 0 | 0 | 0 | 0 | 0 | 0 | 0 | 0 | 0 | 1 |
| | | Mineral fiber | 3 | 3 | 3 | 3 | 3 | 3 | 3 | 3 | 3 | 3 |
| Content of copper as copper element (mass %) | | | 10 | 4 | 0 | 4 | 4 | 4 | 4 | 4 | 4 | 4 |
| Content of metal fiber other than copper fiber and copper alloy fiber (iron fiber) (mass %) | | | 0 | 0 | 0 | 0 | 0 | 0 | 0 | 0 | 0 | 1 |
| Content of cashew dust (mass %) | | | 3 | 1 | 1 | 1 | 5 | 3 | 3 | 3 | 3 | 3 |
| Content of zirconium oxide (mass %) | | | 37 | 25 | 25 | 37 | 37 | 25 | 50 | 37 | 37 | 37 |
| Evaluation | Friction coefficient | | 0.40 | 0.37 | 0.35 | 0.38 | 0.36 | 0.37 | 0.39 | 0.41 | 0.41 | 0.41 |
| | Anti-crack properties | | Score 1 | Score 2 | Score 3 | Score 2 | Score 2 | Score 1 | Score 3 | Score 1 | Score 1 | Score 1 |
| | Abrasion resistance (mm/1000 brakings) | 100° C. | 0.113 | 0.143 | 0.169 | 0.147 | 0.117 | 0.128 | 0.153 | 0.132 | 0.123 | 0.148 |
| | | 300° C. | 0.60 | 0.73 | 1.32 | 0.82 | 0.74 | 0.77 | 1.01 | 0.80 | 0.71 | 1.11 |

Examples 1-6 exhibit friction coefficient, anti-crack properties, and abrasion resistance on about the same level as those of Comparative example 1 containing copper in a content of more than 5 mass % as a copper element. Furthermore, Examples 1-6 have excellent friction coefficient, anti-crack properties, and/or abrasion resistance compared with Comparative examples 2-4 containing cashew dust in a content of less than 1.5 mass %; Comparative example 5 containing cashew dust in a content of more than 4.5 mass %; Comparative examples 2, 3 and 6 containing zirconium oxide in a content of less than 30 mass %; Comparative example 7 containing zirconium oxide in a content of more than 45 mass %; Comparative examples 8 and 9 containing zirconium oxide with a particle size of more than 30 μm; and Comparative example 10 containing a metal fiber other than a copper fiber and a copper alloy fiber in a content of more than 0.5 mass %.

INDUSTRIAL APPLICABILITY

The non-asbestos frictional material composition of the present invention, and a frictional material and a friction member formed by using the composition have low environmental load due to the low content of copper in abrasion powder generated during the braking, can provide excellent friction coefficient, anti-crack properties, and abrasion resistance and are therefore suitable for a frictional material and a friction member such as a brake pad for a car, compared with conventional ones.

The invention claimed is:

1. A non-asbestos frictional material composition, comprising:
   a binder;
   an organic filler comprising:
      cashew dust in a content of 1.5-4.5 mass % of the total mass of the composition;
   an inorganic filler comprising:
      zirconium oxide with a particle size of 30 μm or less in a content of 30-45 mass % of the total mass of the composition, and not containing zirconium oxide with a particle size of more than 30 μm; and
   a fiber base material, comprising:
      an aramid fiber;
      a mineral fiber;
      copper in a content of 5 mass % or less of the total mass of the composition as a copper element; and
      a metal fiber other than a copper fiber and a copper alloy fiber in a content of 0.5 mass % or less of the total mass of the composition,
   wherein the content of the fiber base material is 5-10 mass % of the total mass of the composition.

2. The non-asbestos frictional material composition according to claim 1, wherein the mean particle size of the zirconium oxide falls within the range of 1-7 μm.

3. The non-asbestos frictional material composition according to claim 1, wherein the fiber base material comprises a mineral fiber with a mean fiber length of the entire mineral fiber of 100-400 μm.

4. The non-asbestos frictional material composition according to claim 1, wherein the binder is selected from the group consisting of a phenol resin, an acrylic modified phenol resin, a silicone elastomer-dispersed phenol resin, and an alkylbenzene-modified phenol resin.

5. A frictional material being formed from the non-asbestos frictional material composition according to claim 2.

6. A friction member being formed from a frictional material formed from the non-asbestos frictional material composition according to claim 2 and a backing plate.

7. A frictional material being formed from the non-asbestos frictional material composition according to claim 1.

8. A friction member being formed from a frictional material formed from the non-asbestos frictional material composition according to claim 1 and a backing plate.

* * * * *